United States Patent Office 2,898,211
Patented Aug. 4, 1959

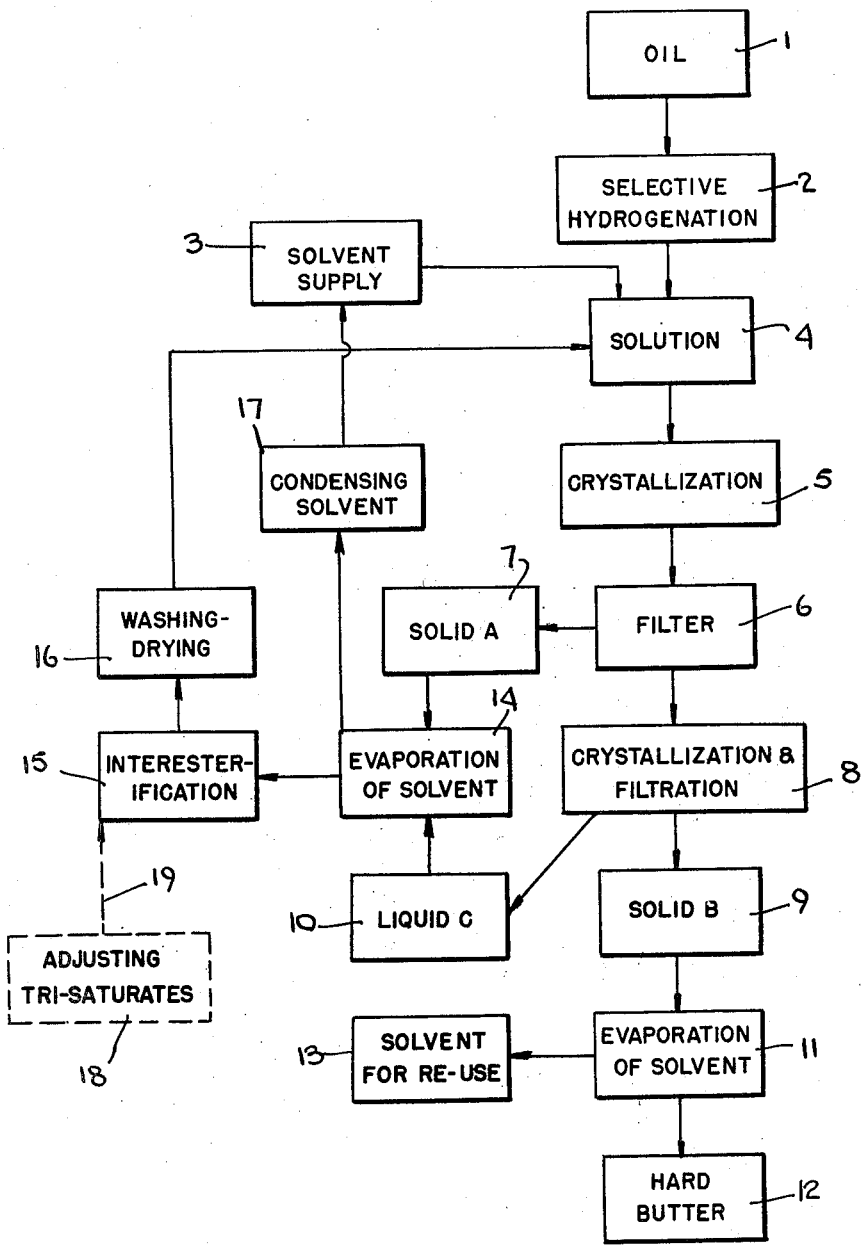

2,898,211
METHOD OF MAKING HARD BUTTER

George Barsky, New York, N.Y., and Vigen K. Babayan, Livingston, and Bernard J. Bahoshy, Parsippany-Troy Hills, N.J., assignors to E. F. Drew & Co., Inc., New York, N.Y., a corporation of Delaware Application August 18, 1955, Serial No. 529,096

11 Claims. (Cl. 99—118)

The present invention is directed to the production of a fat composition which is normally known as a hard butter and which is used in coatings for confectionery and various other uses.

Processes have been used for production of such hard butters from vegetable oils. One such process which has been known for a number of years consisted in heating a coconut type oil with higher fatty acids under such conditions as to cause displacement of the lower fatty acids by the higher fatty acids. The freed fatty acids were volatilized and removed from the reaction mass which, after hydrogenation and refining, was a hard butter. Such a process is relatively expensive and requires special equipment and relatively close supervision. The product, while being commercially usable, is not completely compatible with other constituents of coating compositions. Furthermore, only a part of the coconut type oil is thus transformed into the hard butter so that the freed fatty acids constitute a by-product. The properties of this product while intended to resemble coco butter, actually is substantially different therefrom in the chemical composition and physical properties.

The present invention is intended and adapted to overcome the difficulties and disadvantages inherent in prior processes for producing hard butter, it being among the objects of the present invention to convert vegetable and animal oils into a butter closely resembling coco butter and being miscible in all proportions therewith and with coating compositions.

It is also among the objects of the present invention to provide a hard butter which may be easily incorporated with chocolate liquors and be completely compatible therewith and wherein compositions containing said butter exhibit reduced bloom or streak.

It is further among the objects of the present invention to provide a simple process which utilizes readily available low cost domestic raw materials and which utilizes substantially all of the raw materials and converts them into the hard butter.

In practicing the present invention, there is utilized a glyceride oil preferably having a substantial proportion of palmitic acid. The fatty acids present have from 16 to 22 carbon atoms. The oil is selectively hydrogenated to an iodine value of about 40 to 60 or the starting oil may have such an iodine value. The hydrogenation is such as to hydrogenate the poly-unsaturates, such as linoleic acid substantially completely to mono-unsaturates, with some stearates. In the operation it is believed that some isooleic acid is formed.

The oil is then dissolved in a suitable volatile solvent at a temperature at which the oil becomes miscible with the solvent and is cooled to a temperature at which crystallization of a fraction which has a relatively high melting point takes place. The latter is removed from the liquid, which is then cooled to a lower temperature whereby the hard butter fraction is crystallized. The filtrate therefrom is mixed with the high melting fraction and interesterified, the product being returned together with fresh hydrogenated oil to the cycle for crystallization, as set forth above. It is desirable at times to adjust the content of the mixture of said filtrate and high melting fraction by adding tri-saturates before interesterification in order to restore the balance of the ratios of the saturated and unsaturated acids. Adjustment may also be made by the addition of oil which is not fully saturated, such as liquid oil or partially hydrogenated oil, for this purpose.

An important factor in the process is the utilization of practically all of the starting material by rearranging and and recycling, and obtaining a satisfactory hard butter which is the practical equivalent of natural coco butter. Essentially, a suitable oil having the desired saturation-unsaturation balance and the proper molecular orientation is brought into contact with a solvent under such conditions that the bulk of the high melting fraction is crystallized out. The remainder is subjected to a second set of conditions whereby the bulk of the mixed glycerides are crystallized out, leaving the di- and tri-unsaturates in solution. The precipitated high melting fraction (fraction A) and the liquid fraction (fraction C) are then mixed and rearranged to give another supply of mixed glycerides which can be used as a starting material, either alone or with additional oil, and treated to first crystallize fraction A and then fraction B, which is the hard butter.

Various solvents may be used having low molecular weights and low boiling points; for instance, ketones such as acetone and hydrocarbons having 3–6 carbon atoms such as propane or butane. Various ratios of solvent to oil may be used and preferably from 2 to 5 parts of solvents are used to 1 part by weight of oil. The temperature at which the solution is made when acetone is the solvent is from 30° to 45° C. and the first crystallization is conducted at temperatures of 10° to 20° C. to give fraction A and at temperatures of −5° C. to +5° C. to give fraction B. Such oils as cottonseed, soya, peanut, palm, corn, tallow and lard are suitable for the present purposes, but cottonseed oil is at present preferred. When other solvents are used or different melting points of the hard butter are desired, the above temperatures will be modified accordingly. In the use of various oils, the conditions of operation may be different but within the limits set forth herein.

In the accompanying drawing constituting a part hereof, there is shown a flow sheet indicating the steps followed in practicing the present invention.

A suitable glyceride oil 1 having 16–22 carbon atoms, is selectively hydrogenated at 2 in order to convert the poly-unsaturated acids to mono-unsaturated acids and some of the mono-unsaturated to saturated acids, after which it is mixed with solvent 3 to form a solution 4 at a sufficiently high temperature to render the oil miscible. The solution is cooled down to a suitable temperature so as to crystallize fraction A, as shown at 5, which contains largely high melting material. The mass is filtered at 6, the solid material 7 constituting fraction A. The solution resulting therefrom is crystallized at a still lower temperature and filtered at 8. The solid material 9 resulting therefrom is fraction B, which is the desired hard butter. The mother liquor 10 contains the liquid glyceride oil which is fraction C.

Fractions A and C are combined at 14 and the solvent evaporated therefrom. The mixture of A and C is then interesterified at 15 and is washed and dried at 16, being returned to solution 4. The vapors arising from 14 are condensed at 17 and returned to solvent supply 3. Adjusting oil 18 is added as shown at 19 to the esterification reaction 15 when deemed desirable. Often the oil is largely saturated triglycerides but under certain conditions more unsaturated oils may be added.

The following are specific examples of the operation of the present invention:

Example 1

3040 grams of cottonseed oil having an iodine value of about 110 is mixed with 12.2 grams of a selective nickel catalyst. Hydrogen is introduced into the system while a temperature of 134° to 137° C. is maintained for about 4¾ hours. The resulting oil has an iodine value of 53.7.

Example 2

250 grams of the hydrogenated oil from Example 1 is dissolved in 1000 grams of acetone at a temperature of about 35° C. The solution is cooled to 15° C. and held at said temperature for 45 minutes. The mass is filtered, the solid material being fraction A.

The filtrate is cooled to 2° C. and held at said temperature for about 50 minutes, causing precipitation of a hard butter, which is fraction B. The product is filtered off and steam deodorized at a temperature of 210° C. for two hours at a vacuum of about 3 mm. mercury pressure. The mother liquor contains fraction C, which can be isolated by the evaporation of the solvent. All of the fractions are dried at 110° C. for about two hours. The analysis of the several fractions is as follows:

|  | A | B | C |
|---|---|---|---|
| Yield, percent | 32.0 | 26.6 | 41.2 |
| I.F. degrees | 119.5 | 92.8 | |
| I.V. | 37.6 | 50.7 | 66.8 |
| M.P.w. degrees | 122.6 | 98.0 | |
| S.P. do | | 28.0 | |

Example 3

A mixture is made of fractions A and C of Example 2 in the proportion of 640 grams of A and 412 grams of C. To the mixture is added 4 grams of sodium methylate, being about 0.3% of the mixture. The latter is heated to about 60° C. and agitated for one-half hour, resulting in chemical reaction and rearrangement of the esters. The product is washed with water until it is neutral to phenolphthalein and then vacuum dried.

Example 4

100 grams of the product of Example 3 is dissolved in 400 grams of acetone at about 37° C. The solution is cooled to about 15° C. and held at said temperature for a sufficient length of time to complete the precipitation of the higher melting fraction which is designated as fraction A'. The solid is filtered, the filtrate being cooled to about 0° C. and held at said temperature for a sufficient length of time to complete precipitation of the hard butter fraction which is designated as fraction B'. The mother liquor therefrom contains fraction C' and it is subjected to evaporation to remove the solvent. The products have the following analysis:

|  | A' | B' | C' |
|---|---|---|---|
| Yield, percent | 19.5 | 21.2 | 57 |
| I.F. degrees | 122.4 | 95 | |
| I.V. | 29.0 | 46.5 | 65 |
| M.P.w. degrees | 124.9 | 100.6 | |
| S.P. do | | 30.3 | |

Fractions A' and C' are mixed, interesterified, and then returned to the system to be recycled and reconverted as described above.

Example 5

100 grams of hydrogenated palm oil having an iodine value of 40.4 is dissolved in 400 grams of acetone and cooled to about 20° C. After a sufficient time for precipitation, there is formed a fraction A. The solution remaining after filtering off fraction A is cooled to about 5° C., causing a deposit of the hard butter fraction B. The mother liquor contains fraction C in solution. The products have the following analysis:

|  | A | B | C |
|---|---|---|---|
| Yield, percent | 32.0 | 31.0 | 37.0 |
| I.F. degrees | 117.0 | 90.3 | |
| I.V. | 22.7 | 35.9 | 56.3 |
| M.P.w. degrees | 131.9 | 99.7 | |
| S.P. do | | 26.0 | |

Example 6.—Six cycle operation on cottonseed oil

In operating the process, one proceeds as shown in the flow sheet and as described in Examples 1 to 4. To increase the yield of fraction B in subsequent cycles, there is added to the mixed fractions A and C, a substantial amount of tri-saturates such as tri-palmitin before interesterification. The following table is a summary of the process wherein the constituents have been carried through six cycles.

| Cycle | 1 | 2 | 3 | 4 | 5 | 6 |
|---|---|---|---|---|---|---|
| Lbs. Hydrog. C/S Oil | 130 | 50 | 35 | | 41 | 48 |
| Lbs. Recycled A and C | | 80 | 105 | 105 | 64 | 62 |
| Percent Tripalmitin | | | | 6 | | 3 |
| Lbs. Fraction B | 40 | 32 | 28 | 33 | 33 | 28 |
| Percent Yield of Fraction B | 31 | 24.6 | 20 | 31.4 | 31.4 | 25.5 |
| M.P.w. | 97.7 | 92.8 | 99.3 | 99.9 | 94.6 | 99.7 |
| I.V. | 56.5 | 55.3 | 52.1 | 49 | 54.3 | 52.1 |

Some of fraction B is not included in the above yields due to mechanical losses in the handling of the materials.

The hard butter puroducts (fractions B) obtained in the several cycles are combined and deodorized to give a hard butter having the following characteristics:

Free fatty acid number _____ 0.09
Iodine value _____ 53.6
Melting point (Wiley) _____° F__ 94.8
Incipient fusion _____° F__ 90.0
Setting point _____° C__ 27.9

Example 7

Hydrogenated cottonseed oil obtained by the process of Example 1 is dissolved in N-pentane at room temperatures, 19°–21° C. The solution is cooled to 11° C., causing precipitation of fraction A which is separated; the yield is 13.3%; it has a melting point (Wiley) of 123.8° F. and an iodine value of 34.9. The remaining solution is cooled to −20° C. and fraction B is precipitated and recovered; the yield thereof is 60.2%, and it has a melting point (Wiley) of 102.2° F. and an iodine value of 53.5. The mother liquor which remains has an iodine value of 76.5, and constitutes fraction C. Fractions A and C are combined and further cycled as described in Examples 3 and 4, or in Example 6.

Example 8

1000 grams of hydrogenated cottonseed oil having an iodine value of 53.6 is dissolved in 4000 grams of propane under pressure at a temperature of about 20° C. The solution is cooled to about −1° C. to precipitate fraction A, which is filtered off. The residual solution is then cooled to about −18° C. to precipitate the hard butter fraction B, which is filtered off, leaving a mother liquor which is fraction C in solution in propane. The following table gives the analysis of the products:

|  | A | B | C |
|---|---|---|---|
| Yield, percent | 35.0 | 30.0 | 35.0 |
| I.F. degrees | 117.0 | 91.5 | |
| I.V. | 39.5 | 54.0 | 68.0 |
| M.P.w. degrees | 119.8 | 96.0 | |
| S.P. do | | 27.5 | |

The solvent is evaporated from the mother liquor and fractions A and C are dried, mixed and interesterified as set forth in Example 3. The product is mixed with fresh oil and fractionally crystallized as stated above in this example to give additional hard butter.

In the various specific examples given above, the operation of crystallization may be modified by the use of higher temperatures, but the yields of fraction B are decreased; for instance, at −5° C. the yield of fraction B is 38.5% and at 0° C. the yield is 22.0%.

Generally, the higher melting fraction A has a melting point over about 105° F.; fraction B has a melting point between about 90° and 115° F., preferably between 90° and 100° F. Fraction C is liquid below about 80° F. The incipient fusion of fraction B is about 80°–105° F. The hard butter (fraction B) has an iodine value of about 45 to 55, being substantially higher than the iodine value of coco butter, which is usually 38 or less; still the physical characteristics of the present product are comparable to coco butter. For some reason, in spite of the high iodine value which, in accordance with prior knowledge, would indicate a liquid at room temperatures, a considerably higher melting range is obtained.

An essential feature of the invention is the interesterification or rearrangement, and the recycling of the materials. Applicants' process is economical because it eventually utilizes all of the starting materials, whereas prior methods resulted in uneconomical, low yields.

Although the invention has been described setting forth several specific embodiments thereof, the examples are intended to illustrate the character of the invention and not to limit it. Various changes in the details may be made without departing from the principles set forth. For instance, some oils such as palm oil or tallow may have the correct iodine value naturally, in which case they need not be hydrogenated before entering the solution stage. With various oils and various solvents the conditions of operation may be altered, as the concentration of solutions, temperatures of solution or precipitation, the use of pressure, and the like. Also the conditions may be varied so that the characteristics of fraction B may be adjusted according to requirements of the trade; for instance, a summer grade will have a higher melting point than a winter grade hard butter.

In obtaining the product, fractions A and B may be precipitated together by crystallization of the solution at relatively low temperatures, and then the mixed fraction is redissolved and crystallized at a higher temperature to separate fraction A from fraction B. Or, the starting material may be flaked, fraction C extracted with a suitable solvent under suitable conditions, and then fraction B extracted from the high melting fraction A, and the solvent evaporated to give the hard butter.

We claim:

1. A method of making a hard butter consisting of the steps of providing a glyceride oil containing glycerides of fatty acids having 16–22 carbon atoms, the glycerides including constituents melting above about 105° F., below about 80° F. and intermediate said temperatures, hydrogenating said oil to an iodine value of about 40 to 60 to transform linoleic acid therein to oleic acid and forming some isooleates, dissolving said oil in a volatile solvent at a predetermined temperature, cooling said solution to a sufficiently lower temperature to precipitate said highest melting constituent, separating the liquid portion, further cooling said liquid portion to precipitate a hard butter, and separating said hard butter from the mother liquor, mixing said highest melting constituent and the glyceride oil from said mother liquor, interesterifying said mixture, mixing said interesterified mixture with said glyceride oil and repeating the aforesaid cycle.

2. A method of making a hard butter consisting of the steps of providing a glyceride oil containing glycerides of fatty acids having 16–22 carbon atoms, the glycerides including constituents melting above about 105° F., below about 80° F. and intermediate said temperatures, having an iodine value of 40 to 60 dissolving said oil in a volatile solvent at a predetermined temperature, cooling said solution to a sufficiently lower temperature to precipitate said highest melting constituent, separating the liquid portion, further cooling said liquid portion to precipitate a hard butter, and separating said hard butter from the mother liquor, mixing said highest melting constituent and the glyceride oil from said mother liquor, interesterifying said mixture, mixing said interesterified mixture with said glyceride oil and repeating the aforesaid cycle.

3. A method of making a hard butter consisting of the steps of providing a glyceride oil containing glycerides of fatty acids having 16–22 carbon atoms, the glycerides including constituents melting above about 105° F., below about 80° F. and intermediate said temperatures, having an iodine value of 40 to 60 dissolving said oil in a volatile solvent at a predetermined temperature, cooling said solution to a sufficiently lower temperature to precipitate said highest melting constituent, separating the liquid portion, further cooling said liquid portion to precipitate a hard butter, and separating said hard butter from the mother liquor, mixing said highest melting constituent and the glyceride oil from said mother liquor, interesterifying said mixture, mixing said interesterified mixture with said glyceride oil and repeating the aforesaid cycle.

4. A method of making a hard butter consisting of the steps of providing a glyceride oil having an iodine value of about 40–60, dissolving said oil in a volatile solvent, cooling said solution to a sufficiently lower temperature to precipitate high melting glycerides, separating the liquid portion, further cooling the same sufficiently to precipitate a hard butter, separating said hard butter from the mother liquor, mixing said high melting glycerides and the glyceride oil from said mother liquor, interesterifying said mixture, mixing said interesterified mixture with said glyceride oil and repeating the aforesaid cycle.

5. A method of making a hard butter consisting of the steps of providing a glyceride oil having an iodine value of about 40–60, dissolving said oil in a volatile solvent, cooling said solution to a sufficiently lower temperature to precipitate higher melting glycerides, separating the liquid portion, further cooling the same sufficiently to precipitate a hard butter, separating said hard butter from the mother liquor, mixing said higher melting glycerides and the glyceride oil from said mother liquor, introducing tri-saturates into said substances, interesterifying said mixture, mixing said interesterified mixture with said glyceride oil and repeating the aforesaid cycle.

6. A method of making a hard butter consisting of the steps of providing hydrogenated cottonseed oil having an iodine value of about 40–60, dissolving said oil in a volatile solvent, cooling said solution to about 10°–20° C. to precipitate higher melting glycerides, separating the liquid portion, further cooling the same to about −5° to +5° C. to precipitate a hard butter, separating said hard butter from the mother liquor, mixing said higher melting glycerides and the glyceride oil from said mother liquor, interesterifying said mixture, mixing said interesterified mixture with said glyceride oil and repeating the aforesaid cycle.

7. A method of making a hard butter consisting of the steps of providing hydrogenated cottonseed oil having an iodine value of about 40–60, dissolving said oil in a volatile solvent, cooling said solution to about 10°–20° C. to precipitate higher melting glycerides, separating the liquid portion, further cooling the same to about −5° to +5° C. to precipitate a hard butter, separating said hard butter from the mother liquor, mixing said higher melting glycerides and the glyceride oil from said mother liquor, introducing higher melting glycerides into said substances, interesterifying said mixture, mixing said interesterified mixture with said glyceride oil and repeating the aforesaid cycle.

8. A method of making a hard butter consisting of the steps of providing hydrogenated cottonseed oil having an iodine value of about 40–60, dissolving said oil in a volatile solvent, cooling said solution to about 10°–20° C. to precipitate higher melting glycerides, separating the liquid portion, further cooling the same to about −5° to +5° C. to precipitate a hard butter, separating said hard butter from the mother liquor, mixing said higher melting glycerides and the glyceride oil from said mother liquor, introducing lower melting glycerides into said substances, interesterifying said mixture, mixing said interesterified mixture with said glyceride oil and repeating the aforesaid cycle.

9. A method according to claim 2 in which said solvent is taken from the class consisting of ketones and hydrocarbons having 3–6 carbon atoms.

10. A method according to claim 2 in which said first cooling is at a temperature of about 10°–20° C.

11. A method according to claim 2 in which the ratio of solvent to oil is about 2–5 to 1 by weight.

References Cited in the file of this patent

UNITED STATES PATENTS

| | | |
|---|---|---|
| 2,442,536 | Eckey | June 1, 1948 |
| 2,553,288 | Young et al. | May 15, 1951 |
| 2,608,564 | Young et al. | Aug. 26, 1952 |
| 2,645,652 | Pramuk et al. | July 14, 1953 |
| 2,667,418 | Barsky et al. | Jan. 26, 1954 |
| 2,684,377 | Skau et al. | July 20, 1954 |
| 2,684,378 | Skau et al. | July 20, 1954 |
| 2,685,592 | Barsky et al. | Aug. 3, 1954 |
| 2,729,659 | Ault et al. | Jan. 3, 1956 |

FOREIGN PATENTS

| | | |
|---|---|---|
| 590,916 | Great Britain | July 31, 1947 |

OTHER REFERENCES

Bailey: "Industrial Oil and Fat Products" (1951), p. 140.

Boucher et al.: Jour. Amer. Oil Chem. Soc., September 1952, vol. 29, pp. 382–385.